US012613836B1

(12) United States Patent
Derzhavetz et al.

(10) Patent No.: US 12,613,836 B1
(45) Date of Patent: Apr. 28, 2026

(54) MANAGING SPACE-ACCOUNTING METADATA

(71) Applicant: Dell Products L.P., Round Rock, TX (US)

(72) Inventors: Jenny Derzhavetz, Raanana (IL); Vladimir Shveidel, Pardes Hana-Karkur (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/925,305

(22) Filed: Oct. 24, 2024

(51) Int. Cl.
| | |
|---|---|
| *G06F 7/00* | (2006.01) |
| *G06F 16/13* | (2019.01) |
| *G06F 16/174* | (2019.01) |

(52) U.S. Cl.
CPC ........ *G06F 16/1756* (2019.01); *G06F 16/137* (2019.01)

(58) Field of Classification Search
CPC ........................... G06F 16/1756; G06F 16/137
See application file for complete search history.

(56) References Cited

U.S. PATENT DOCUMENTS

| | | | | |
|---|---|---|---|---|
| 8,271,447 B1 * | 9/2012 | Natanzon | ............ | G06F 11/1471 |
| | | | | 707/660 |
| 11,042,296 B1 * | 6/2021 | Shveidel | ............... | G06F 3/0659 |
| 2010/0293097 A1 * | 11/2010 | Pomeroy | ............ | H04L 63/0457 |
| | | | | 709/204 |
| 2014/0006465 A1 * | 1/2014 | Davis | ................. | G06F 16/1752 |
| | | | | 707/827 |

| | | | | |
|---|---|---|---|---|
| 2014/0149698 A1 * | 5/2014 | Ezra | .................... | G06F 12/0864 |
| | | | | 711/162 |
| 2014/0181119 A1 * | 6/2014 | Chiueh | ................. | G06F 16/137 |
| | | | | 707/747 |
| 2016/0092593 A1 * | 3/2016 | Peacock | ............... | G06F 16/182 |
| | | | | 707/796 |
| 2017/0192892 A1 * | 7/2017 | Pundir | .................. | G06F 3/0644 |
| 2020/0241793 A1 * | 7/2020 | Shveidel | .............. | G06F 3/0604 |
| 2022/0334726 A1 * | 10/2022 | Ogawa | .................. | G06F 3/0635 |
| 2023/0026819 A1 * | 1/2023 | Love | .................... | G06F 12/0804 |
| 2023/0106982 A1 * | 4/2023 | David | .................. | G06F 3/0637 |
| | | | | 707/704 |
| 2023/0384943 A1 * | 11/2023 | Dovzhenko | ........... | G06F 3/0613 |

OTHER PUBLICATIONS

Derzhavetz, Jenny, et al.; "Processing Metadata Changes Using Multiple Aggregation Policies," U.S. Appl. No. 18/494,196, filed Oct. 25, 2023.
Shveidel, Vladimir, et al.; "Destaging Metadata Changes Using Read Locks," United States U.S. Appl. No. 18/414,632, filed Jan. 17, 2024.
Shveidel, Vladimir, et al.; "Managing Decref Processing From Tablets Containing Sorted Buckets," United States U.S. Appl. No. 18/644,361, filed Apr. 24, 2024.

* cited by examiner

*Primary Examiner* — Mohammed R Uddin
(74) *Attorney, Agent, or Firm* — BainwoodHuang

(57) ABSTRACT

A technique of managing space-accounting updates includes receiving a set of updates to space-accounting metadata of a specified volume, performing a lookup for the specified volume in a volume table that maps volumes to respective delta records, the lookup identifying a delta record that stores a set of space-accounting changes for the specified volume, and writing to the delta record to account for the set of updates.

20 Claims, 5 Drawing Sheets

140b

LI-1

210

VI-0 SA METADATA

VI-1 SA METADATA

. . .

VI-63 SA METADATA

| Volume Table 162 | | Page Table 164 |
|---|---|---|

LI-1

170-1

VI-1
(LI-1; EI-1)
Logical Space Cnt
Physical Space Cnt
...

VI-1

170-2

VI-14
(LI-1; EI-14)
Logical Space Cnt
Physical Space Cnt
...

VI-14

310: Delta List

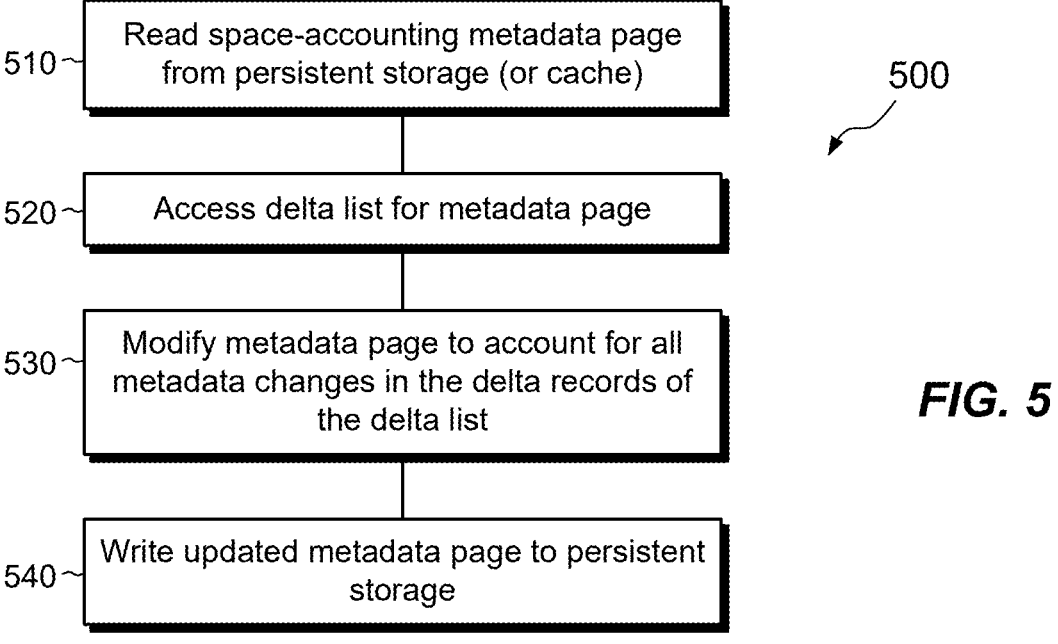

510 — Read space-accounting metadata page from persistent storage (or cache)

520 — Access delta list for metadata page

530 — Modify metadata page to account for all metadata changes in the delta records of the delta list 540 — Write updated metadata page to persistent storage

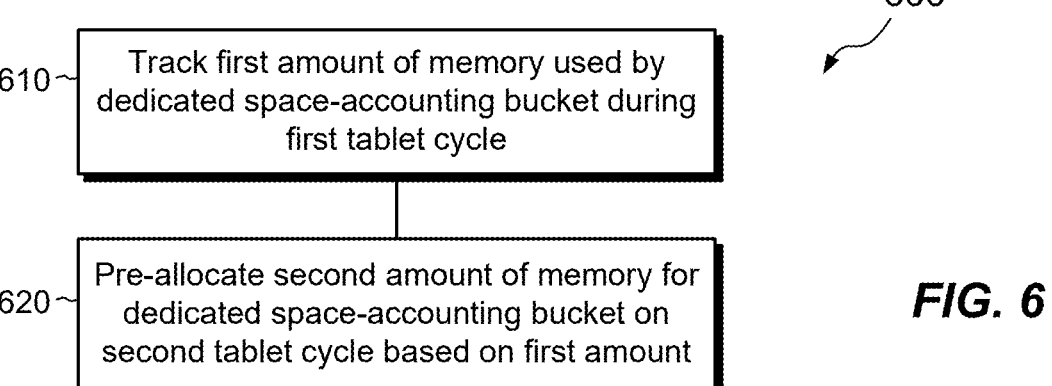

600

610 — Track first amount of memory used by dedicated space-accounting bucket during first tablet cycle 620 — Pre-allocate second amount of memory for dedicated space-accounting bucket on second tablet cycle based on first amount

*FIG. 6*

710 ~ Receive a set of updates to space-accounting metadata of a specified volume 720 ~ Perform a lookup for the specified volume in a volume table that maps volumes to respective delta records, the lookup identifying a delta record that stores a set of space-accounting changes for the specified volume 730 ~ Write to the delta record to account for the set of updates

700

750

MANAGING SPACE-ACCOUNTING METADATA

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Operations of a storage system commonly entail changing system metadata, such as reference counts, pointers, statistics, and the like. One approach to managing such changes includes operating two in-memory tablets, an active tablet and a frozen tablet. As actions arise which result in metadata changes, the storage system writes the changes to the active tablet. When the active tablet becomes full, the storage system freezes the active tablet, making it the new frozen tablet, and resets the frozen tablet, making it the new active tablet. The storage system then destages the metadata changes from the frozen tablet, writing the changes to metadata pages in persistent storage.

Within each tablet, the storage system arranges metadata updates in sorted buckets, where each bucket accumulates metadata changes for a particular group of metadata pages. Some of these metadata pages store space-accounting statistics for particular volumes, and a single metadata page may contain space-accounting statistics for multiple volumes. The term "volume" as used herein refers to both production volumes and snapshots of those volumes. The statistics for a volume may include, for example, an amount of logical space consumed by the volume, an amount of physical space consumed by the volume, and an amount of unique space consumed by the volume. "Logical space" refers to the apparent size of the volume from the host perspective, whereas "physical space" refers to the actual size of the volume on disk. "Unique space" refers to data that is unique to the volume and cannot be found elsewhere.

SUMMARY

Certain embodiments are directed to a method of managing space-accounting updates. The method includes receiving a set of updates to space-accounting metadata of a specified volume, performing a lookup for the specified volume in a volume table that maps volumes to respective delta records, the lookup identifying a delta record that stores a set of space-accounting changes for the specified volume, and writing to the delta record to account for the set of updates.

Other embodiments are directed to a computerized apparatus constructed and arranged to perform a method of managing space-accounting updates, such as the method described above. Still other embodiments are directed to a computer program product. The computer program product stores instructions which, when executed on control circuitry of a computerized apparatus, cause the computerized apparatus to perform a method of managing space-accounting updates, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 5 is a flowchart showing an example method of destaging space-accounting changes to persistent storage according to one or more embodiments.

FIG. 6 is a flowchart showing an example method of adaptively allocating memory for a dedicated bucket used for tracking space-accounting metadata for volumes, according to one or more embodiments.

DETAILED DESCRIPTION

The above-described arrangement of tablets and buckets works best when metadata changes are evenly distributed across many metadata pages tracked by many buckets. Unfortunately, updates to space-accounting metadata tend to concentrate metadata changes in particular metadata pages. For example, large numbers of space-accounting updates for a particular volume may arise within a short period of time, causing many changes to be directed to the same metadata page and thus to the same bucket. Any space-accounting updates made to this bucket may involve exclusively locking the entire bucket, causing other updates directed to the same bucket to be serialized and thus delayed. If the space-accounting changes are parts of transactions that also involve other types of metadata changes (e.g., updates to pointers, reference counts, etc.), those transactions are also delayed. What is needed, therefore, is a more efficient way of managing space-accounting updates.

The above need is addressed at least in part by an improved technique of managing updates in space-accounting metadata. The technique includes receiving space-accounting updates for a specified volume and identifying, based on a lookup for the specified volume in a volume table, a delta record that stores space-accounting metadata changes for that volume. The technique further includes writing to the delta record to account for the space-accounting updates.

Advantageously, the improved technique records space-accounting updates in a delta record based on a volume. Updating space-accounting metadata for a particular volume typically can be achieved without the need to lock an entire bucket, reducing delays due to serialization and improving system performance.

According to one or more embodiments, a storage system uses a dedicated bucket for tracking space-accounting metadata for volumes. The bucket includes the above-described volume table, which associates volumes with respective delta records, as well as a page table, which associates metadata pages with delta records for volumes whose space-accounting metadata are tracked by those metadata pages. When the dedicated bucket is operated as part of an active tablet, the storage system uses the volume table to create, locate, and update delta records for respective volumes. When the dedicated bucket is operated as part of a frozen tablet, the storage system uses the page table to identify delta records for all volumes whose space-accounting metadata are tracked by a particular metadata page, enabling page-based destaging of space-accounting changes to persistent storage.

Embodiments of the improved technique will now be described. One should appreciate that such embodiments are provided by way of example to illustrate certain features and principles but are not intended to be limiting.

Figure 1:
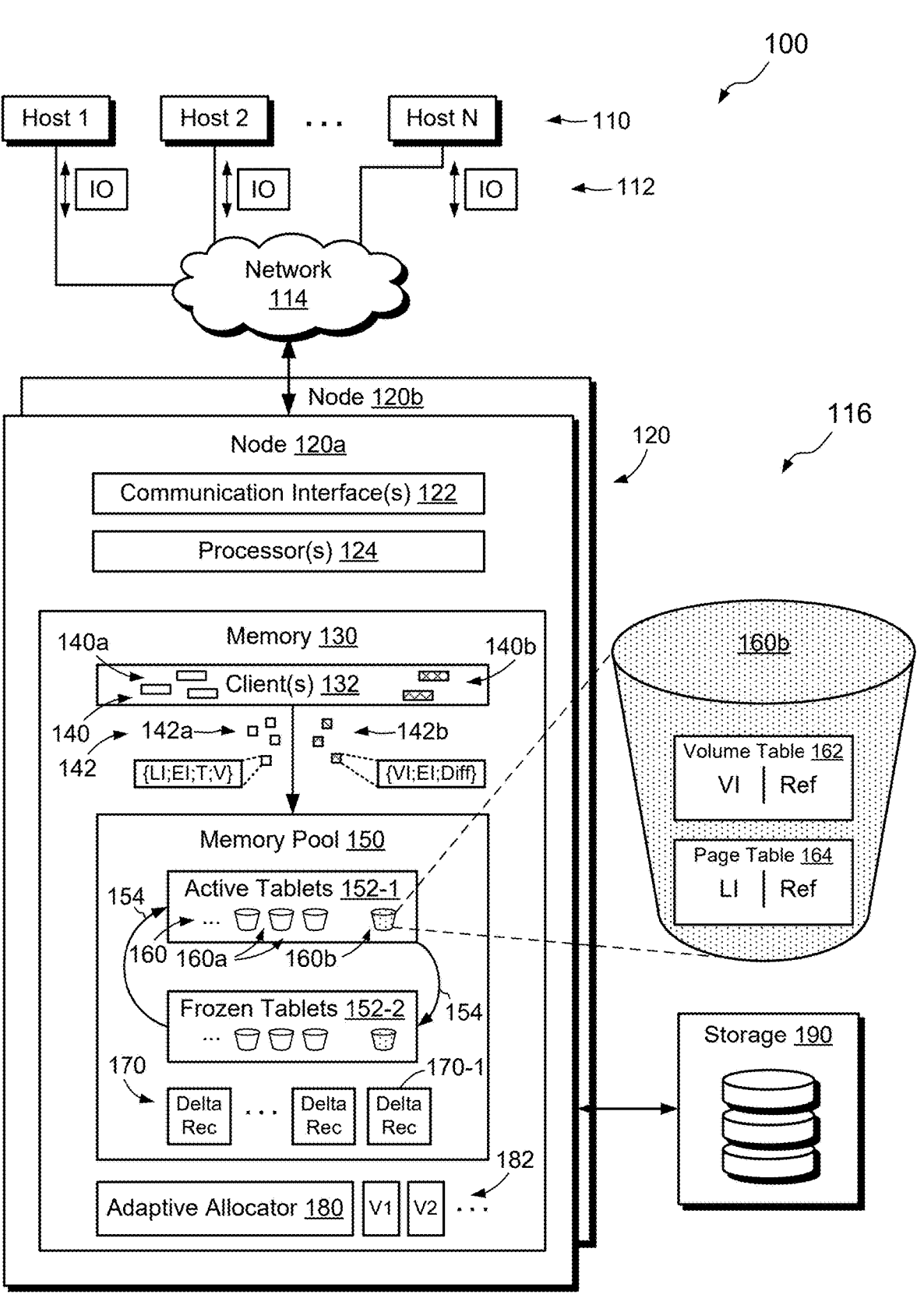
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions with associated data, one or more clients 132, a memory pool 150, and an adaptive allocator 180. The memory 130 further includes representations of various volumes 182 (V1, V2, ... ), the data of which may be persisted in storage 190. The clients 132 may include a cache and/or one or more programs that store or otherwise access metadata pages 140, such as standard metadata pages 140a and space-accounting metadata pages 140b. The standard metadata pages 140a include pages containing mapping pointers, virtual blocks, and the like, whereas the space-accounting metadata pages 140b include pages containing space-accounting metadata for tracking statistics related to volumes 182. The statistics for a volume may include, for example, its logical size, physical size, unique size, and/or other factors, which are typically expressed as counter values, which may be increased and/or decreased by storage-system activities.

The memory pool 150 is an allocated region of memory 130 dedicated to aggregating metadata changes. For example, the memory pool 150 has a specified size that is shared between an active tablet 152-1 and a frozen tablet 152-2. The active tablet 152-1 is configured to receive new metadata changes 142 from client(s) 132, to store the metadata changes 142 in delta records 170, and to organize the changes 142 using buckets 160. The buckets 160 include both standard buckets 160a for tracking standard metadata changes and a dedicated bucket 160b for tracking space-accounting metadata changes. Although a single dedicated bucket 160b is shown in the depicted example, other examples may provide multiple dedicated buckets 160b, such as different buckets for tracking space accounting for different types of volumes.

The frozen tablet 152-2 is a frozen version of a previously active tablet 152-1. For example, once the active tablet becomes full (e.g., consumes its allocated share of the memory pool 150), node 120 freezes the active tablet, so that no further metadata changes 142 are accepted. Around the same time, node 120 clears and reactivates the frozen tablet, such that it becomes the new active tablet and is able to receive new metadata changes 142. A tablet switch 154 indicates a change between active and frozen tablets. The frozen tablet 152-2 may be destaged to storage 190, e.g., by reading metadata pages 140 referenced by the frozen tablet, updating the metadata pages to include all of the indicated changes, and writing the updated pages 140 to storage 190.

Adaptive allocator 180 is configured to allocate space for the dedicated space-accounting bucket 160b. For example, adaptive allocator 180 monitors how much memory is allocated to the bucket 160b during a first tablet cycle, e.g., when the bucket 160b is part of the active tablet, and then applies that monitored amount of memory in pre-allocating memory space for bucket 160b during a second tablet cycle, which occurs after the first tablet cycle. Pre-allocating memory in this way avoids continual requests for allocation and promotes efficiency.

In example operation, the hosts 110 issue I/O requests 112 to the data storage system 116. The node 120 receives the I/O requests 112 at the communication interfaces 122 and initiates further processing. Such processing may involve defining various metadata changes 142 for metadata pages 140, including defining standard metadata changes 142a for standard metadata pages 140a and defining space-accounting metadata changes 142b for space-accounting metadata pages 140b. Standard metadata changes 142a may arise, for example, from writes, deletes, deduplication, and other activities, whereas space-accounting metadata changes may arise based on changes in volumes 182, such as writes or deletes of data from the volumes 182.

According to one or more embodiments, standard metadata changes 142a and space-accounting metadata changes 142b are structured differently from each other. For example, standard metadata changes 142a may be expressed as tuples having the following elements: LI; EI; T; and V. "LI" is a logical index, such as a logical block address (LBA) of the associated metadata page 140 (the page where the specified metadata change is to be written), and "EI" is an entry index. The need for an EI arises because a metadata page 140a may include multiple entries for respective elements, which may be arranged in an array or similar structure. In such cases, each EI identifies a respective element. "T" corresponds to a type of metadata change, and "V" corresponds to a value, such as a new value to be written.

In contrast, space-accounting metadata changes 142b may be expressed as tuples having multiple elements, such as VI; EI, and Diff. Here, "VI" is a volume identifier of the volume 182 whose space-accounting statistics are being changed. "EI" again is an entry index, which this time corresponds to the location of the space-accounting metadata for a particular volume (VI) within its metadata page 140b. For example, a metadata page 140b may store space-accounting statistics for multiple volumes (VI's), with the statistics for each volume having a respective EI. "Diff" is a set of differences in space-accounting metadata to be applied for the specified volume (VI). For example, if a particular volume has space-accounting metadata for three metadata elements, (1) logical size, (2) physical size, and (3) unique size, then "Diff" may specify changes in all of the metadata elements, such as (1) +1 for logical size, (2) +1 for physical size, and (3) 0 for unique size. The three changes may be provided in an ordered list, such as an array, for example.

An example layout of the dedicated bucket 160b is shown to the right of FIG. 1. Here, the dedicated bucket 160b includes two tables, a volume table 162 and a page table 164.

The volume table 162 is configured to associate identifiers of volumes (VI's) with respective references (REFs) to delta records 170 that store metadata changes for the respective volumes. In an example, a REF to a delta record 170 may be an address of the delta record, such as a pointer to the delta record. Typically, a single delta record 170 is provided for each volume (VI), making the mapping of the volume table 162 one-to-one. Preferably, the volume table 162 is implemented as a hash map, which provides fast lookups for delta records 170 based on VI's.

The page table 164 associates identifiers of metadata pages (e.g., LI's) with respective references (REFs), which point to delta records 170 that store metadata changes for volumes tracked by the respective metadata pages 140b. The references may be addresses or pointers, for example. Although a metadata page 140b may include space-accounting statistics for multiple volumes, the page table 164 typically points to only a single delta record 170 for a single volume, relying on the delta records 170 themselves to point to related delta records for other volumes tracked by the same metadata page 140b.

As an example of operation, assume that a metadata change 142b is issued by a client 132. The metadata change 142b specifies a volume (e.g., VI-1) and an ordinal position (e.g., EI-1) of the metadata changes for volume VI-1 within the containing metadata page 140b. The metadata change 142b also specifies a Diff, such as an array or other ordered data set that provides relative differences in particular space accounting elements, such as logical size, physical size, and unique size. The metadata change 142b may identify itself as a space-accounting change, or the client(s) 132 may do so. As a result, the active tablet 152-1 receives the metadata change 142b and the node 120 accesses the dedicated bucket 160b. Node 120 performs a lookup for the specified volume VI-1 in the volume table 162. For this example, it is assumed that the volume table 162 already associates VI-1 with a delta record 170-1. Node 120 then accesses delta record 170-1 and updates the delta record 170-1 based on the specified changes (Diff). For example, if current values stored in the delta record 170-1 are +5, +4, and +2 (for logical size, physical size, and unique size, respectively), and if the corresponding values specified by Diff are +1, +1, and 0, respectively, then node 120 modifies the delta record 170-1 to store +6, +5, and +2, respectively. Preferably, the modification to delta record 170-1 is an overwrite in place rather than a write to a new location. For example, +5 is changed in place to +6, +4 is changed in place to +5, and +2 remains+2, as the indicated difference is 0. As the volume table 162 already has an entry for VI-1, no changes in the dedicated bucket 160b itself are needed. Rather, the only structure that changes is delta record 170-1, which is outside of the bucket 160b. Thus, there is no need to lock the bucket 160b to perform this update. Other updates can thus access the same bucket 160b without having to wait in line, resulting in significant performance improvements.

The same could not be said if space-accounting changes were tracked instead by a standard bucket 160a. Rather than using tables 162 and 164 for organizing metadata changes stored in delta records 170, standard buckets 160a use tree structures (not shown), where each node of a tree is provided for a respective metadata page (LI) and where multiple metadata changes 142a for a particular page are arranged in a linked list. In the standard arrangement, each new metadata change for a page appends a new element to the linked list for that page, requiring an exclusive lock on the entire bucket 160a. Embodiments of the improved technique avoid this requirement by making changes outside the bucket 162*b*, such that the bucket 162*b* can be freely accessed for performing other updates. In addition, the new practice of overwriting in place delta records 170 to accommodate space-accounting updates avoids consuming large numbers of delta records 170. For example, if space-accounting metadata for the same volume VI-1 is updated 10,000 times during a current tablet cycle, then all 10,000 updates can be achieved using a single delta record 170, rather than by using 10,000 different delta records 170 and arranging them in a linked list. In addition to its other benefits, the improved technique therefore conserves memory.

Figures 2, 3:
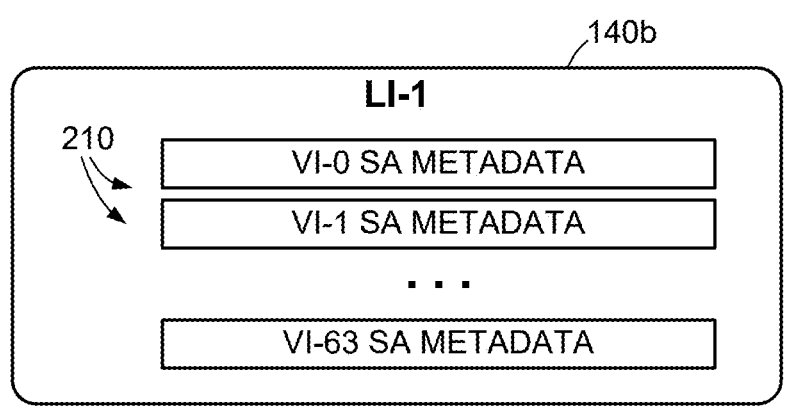
FIG. 2 is a block diagram of an example metadata page that stores space-accounting metadata for multiple volumes, according to one or more embodiments.
FIG. 3 is a block diagram showing an example arrangement for tracking space-accounting updates for multiple volumes whose space-accounting metadata are stored in the same metadata page, according to one or more embodiments.

FIG. 2 shows and example space-accounting metadata page 140*b* in additional detail. As shown, metadata page 140*b* has a page identifier LI-1 (which may be implied) and includes respective entries 210 for storing space-accounting metadata of respective volumes 182, such as VI-0 through VI-63. Other space-accounting metadata pages 140*b* having other page identifiers may store space-accounting metadata for additional volumes 182.

FIG. 3 shows an example arrangement for tracking metadata changes using both the volume table 162 and the page table 164 according to one or more embodiments. For this example, we initially assume that the volume table 162 has an entry for VI-1, as described above. The entry for volume VI-1 includes a reference to delta record 170-1. In this example, record 170-1 is dedicated to volume VI-1 and stores space-accounting metadata for volume VI-1, such as logical space, physical space, unique space, etc. Such space-accounting metadata may be expressed as relative counts, such as +5, +4, and +2 (for logical size, physical size, and unique size, respectively).

As further shown in FIG. 3, the page table 164 includes an entry for space-accounting metadata page LI-1. The entry includes a reference (e.g., pointer) to delta record 170-1. The entry for LI-1 reflects the fact that metadata page LI-1 has been designated for storing the space-accounting metadata for volume VI-1. Also, the location (EI) of this metadata within LI-1 is specified as EI-1, as shown in delta record 170-1.

Assume now that the active tablet 152-1 (FIG. 1) receives a new space-accounting metadata change 142*b* directed to VI-1 and EI-1. Assume, as before, that the associated Diff is +1, +1, and 0. Here, node 120 responds by performing a lookup for VI-1 into the volume table 162, finding a matching entry for VI-1, and then following the reference in the matching entry to delta record 170-1. Node 120 then updates delta record 170-1 in place, e.g., by changing +5 to +6, changing +4 to +5, and keeping +2 as it is. No change is required in either the volume table 162 or the page table 164, and thus no change is required in bucket 160*b*, which contains both tables 162 and 164 (FIG. 1). No lock is needed to complete this update.

Assume further that the active tablet 152-1 receives a new space-accounting metadata change 142*b* specifying a second set of updates to a second volume, identified here is VI-14, and to a second EI, identified here as EI-14. Node 120 responds by performing a lookup for VI-14 in the volume table 162, but this time node 120 finds no matching entry. The absence of a matching entry means that no delta record 170 has yet been created for volume VI-14.

Node 120 responds by creating a new delta record 170-2 for VI-14 and stores the specified set of updates in the new delta record 170-2. Also, node 120 creates a new entry in the volume table 162 for VI-14, which includes providing a reference in the new entry that points to delta record 170-2.

In an example, the identifier (VI) of a volume directly implies the metadata page 140*b* assigned for storing the space-accounting metadata of that volume. For example, if each metadata page stores 64 entries for respective volumes having consecutive VI's (FIG. 2), and assuming space-accounting metadata pages 140*b* are arranged in a sequence, then node 120 can readily determine the metadata page for storing the space-accounting metadata for a particular volume. Here, it is seen that VI-1 and VI-14 are tracked by the same metadata page (LI-1), as they both have volume identifiers within the first 64 VI's.

Because delta records for VI-1 and VI-14 relate to the same metadata page (LI-1), Node 120 associates the delta records 170-1 and 170-2 for VI-1 and VI-14 in a delta list 310. Note that it is not necessary for the page table 164 to point directly to both delta records 170-1 and 170-2 in order to create the delta list 310. Rather, the page table 164 need only point to one delta record, e.g., 170-1, which itself includes a reference (e.g., pointer) to delta record 170-2. With the described arrangement, in which a metadata page 140*b* can have 64 entries for 64 different volumes (FIG. 2), a delta list 310 may include as many as 64 delta records 170. Such delta records 170 may be arranged in a chain, with each delta record 170 except the last delta record in the chain pointing to the next delta record in the chain. One should appreciate that establishing delta lists 310 using delta records 170 themselves relieves the page table 164 from having to maintain the lists 310, thus further minimizing the need for locking the bucket 160*b*. A bucket lock may still be needed, however, when adding new entries to the tables 162 or 164, such as when adding the entry for VI-14. However, creating new entries in tables 162 and 164 is expected to be a rare occurrence compared with updating space-accounting metadata in existing delta records 170.

Figure 4:
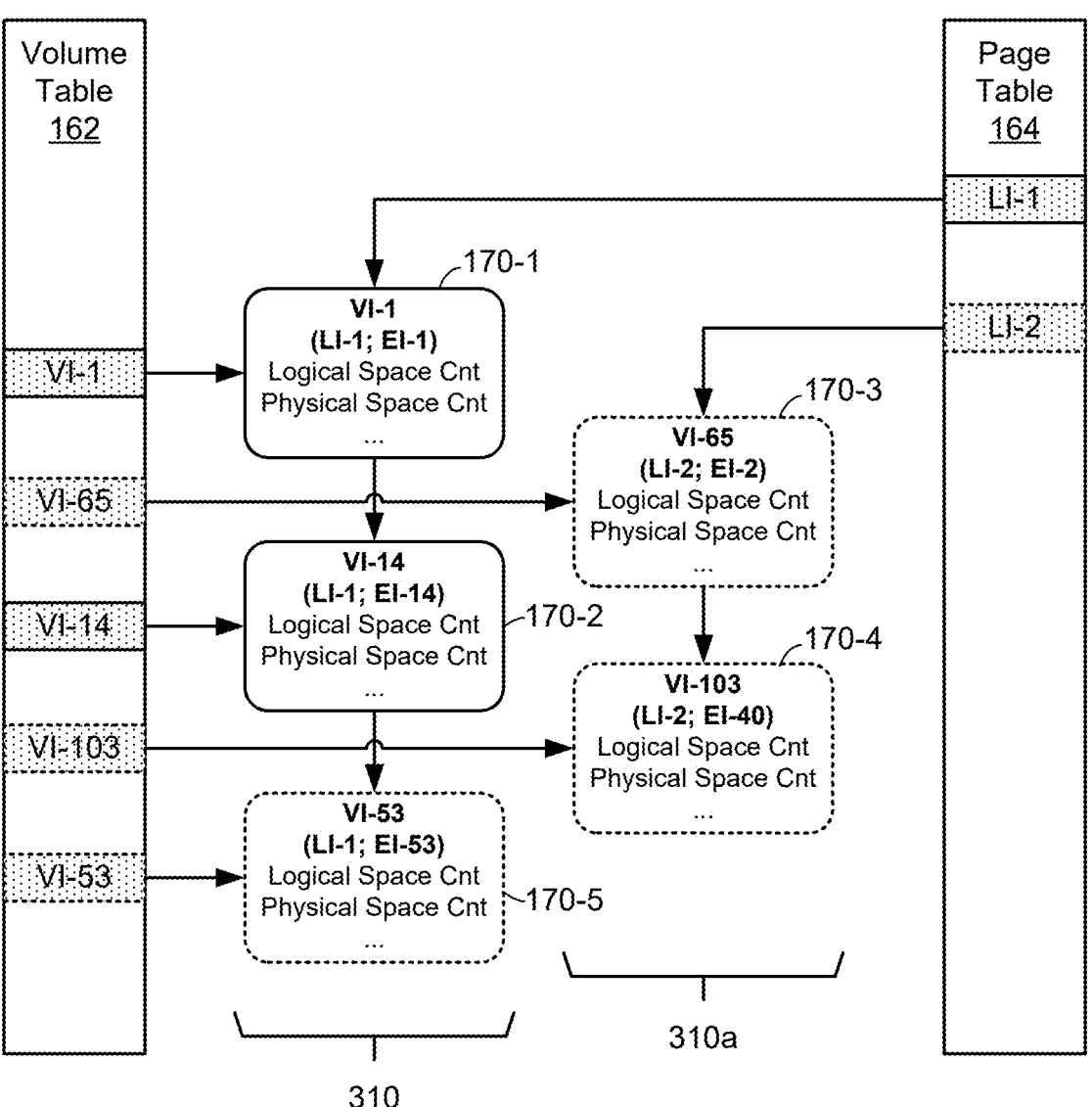
FIG. 4 is a block diagram based on FIG. 3 that shows tracking of additional volumes, including volumes whose space-accounting metadata are stored in an additional metadata page, according to one or more embodiments.

FIG. 4 shows a continuation of the example arrangement of FIG. 3, according to one or more embodiments. Here, it is assumed that a third set of updates is received for a third volume, VI-65. The number "65" exceeds the range of EI's for LI-1 by 2 (FIG. 2), meaning that the space-accounting metadata for VI-65 is tracked by a second metadata page, LI-2, with an associated entry index of EI-2. Node 120 proceeds to perform a lookup for VI-65 in the volume table 162 but finds no results. Node 120 also performs a lookup for LI-2 in the page table 164, also finding no results. Node 120 then responds by creating a new delta record 170-3 for VI-65 and storing the third set of updates in the new delta record 170-3. Node 120 further responds by creating an entry for VI-65 in the volume table 162 and by creating a separate new entry for LI-2 in the page table 164. Both new entries have respective references that point to the new delta record 170-3.

Next, assume that a fourth set of updates is received for a fourth volume, VI-103. Node 120 performs a lookup in the volume table 162 for VI-103 but finds no match. Node 120 then calculates the LI and EI corresponding to VI-103, finding them to be LI-2 and EI-40. Node 120 performs a lookup into the page table 164 for LI-2 and successfully finds a matching entry. The matching entry for LI-2 points to delta record 170-3 (for VI-65). Node 120 creates a new delta record 170-4 for VI-103 and stores the fourth set of updates in the new delta record 170-4. Node 120 further creates a new entry in the volume table 162 for VI-103 and points the new entry to delta record 170-4. Node 120 goes back to the page table 164 and follows the reference for LI-2 to delta record 170-3. Upon detecting that delta record 170-3 has no reference to a next delta record in a chain, node 120 writes a reference to delta record 170-4 in the delta record 170-3, establishing a new delta list 310*a*.

Assume further that a fifth set of updates is received for a fifth volume, this time VI-53. Node 120 performs a lookup in the volume table 162 for VI-53 but finds no results. At this time or later, node 120 creates a new delta record 170-5 for VI-53 and stores the fifth set of updates in the delta record 170-5. Node 120 calculates the LI and EI corresponding to VI-53, finding them to be LI-1 and EI-53. Node 120 performs a lookup in the page table 164 for LI-1 and successfully finds a matching entry. Node 120 follows the reference in the matching entry to delta record 170-1 and discovers therein a reference to delta record 170-2. Node 120 then checks delta record 170-2 and finds no reference to a next delta record 170 in the chain. Node 120 then writes a reference to delta record 170-5 in delta record 170-2, elongating the delta list 310. Operation proceeds in this manner until the next tablet switch 154, when the active tablet 152-1 becomes a new frozen tablet 152-2. Once the active tablet is frozen, destaging of the previously active tablet can proceed.

Figure 7:
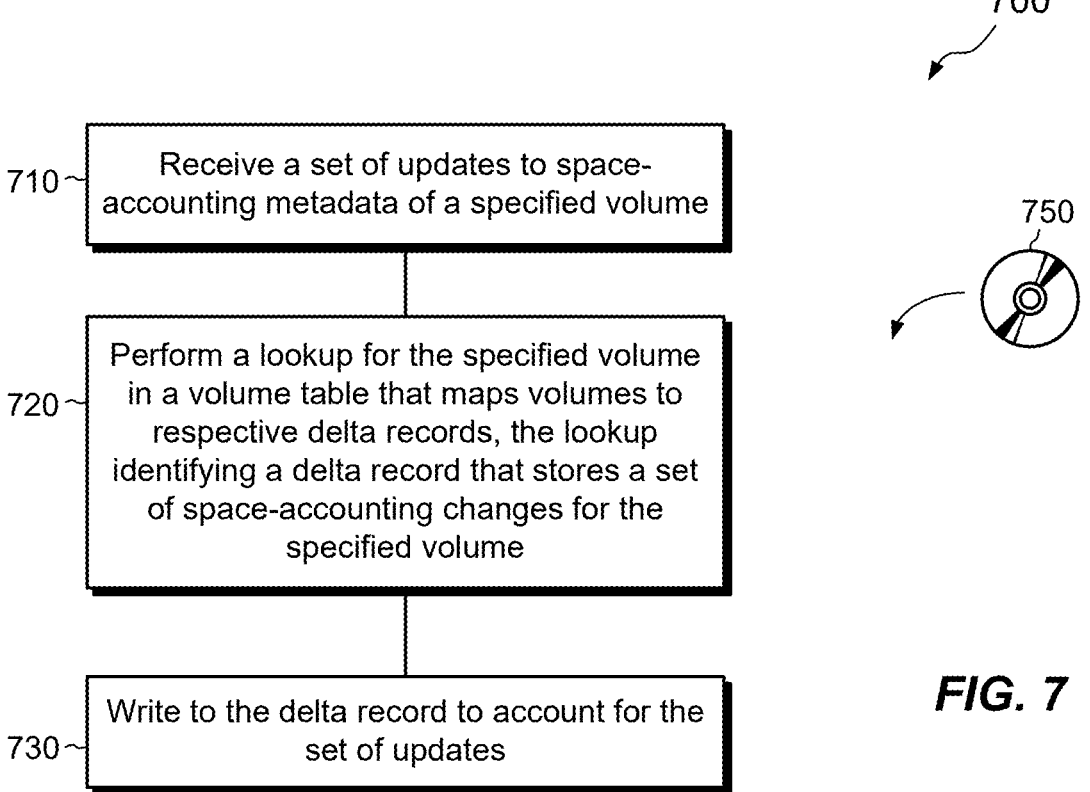
FIG. 7 is a flowchart showing an example method of managing space-accounting updates, according to one or more embodiments.

FIGS. 5-7 show example methods 500, 600, and 700 that may be carried out in connection with the environment 100. The methods 500, 600, and 700 are typically performed, for example, by the software constructs described in connection with FIG. 1, which reside in the memory 130 of a node 120 and are run by the set of processors 124. The various acts of methods 500, 600, and 700 may be ordered in any suitable way and may include performing some acts simultaneously.

FIG. 5 shows an example method 500 of destaging space-accounting metadata updates to metadata pages in persistent storage 190 according to one or more embodiments. In an example, method 500 is performed on the dedicated bucket 160*b* in a currently frozen tablet 152-2.

At 510, node 120 checks the dedicated bucket 160*b* for space-accounting metadata pages that have changed. For example, node 120 checks the metadata pages listed in the page table 164. Starting with a first page LI-1 (FIG. 4), node 120 performs a read of the page, e.g., from persistent storage 190 or from cache if a current version of the page can be found in cache.

At 520, node 120 accesses the delta list 310 (or 310*a*) for the listed page. For example, node 120 accesses delta list 310 for LI-1 by following the reference associated with LI-1 in the page table 164 to delta record 170-1, and, by following the pointers to delta records 170-2 and 170-5.

At 530, node 120 modifies the metadata page that was read at 510 to account for all metadata changes in the delta records of the delta list 310, e.g., all of the updates specified in the delta records 170-1, 170-2, and 170-5 for changes in ELI-1, EI-14, and ELI-53, respectively.

At 540, node 120 writes the modified page to persistent storage 190. Acts 510, 520, 530, and 540 may be repeated for each metadata page listed in the page table 164.

FIG. 6 shows an example method 600 for adaptively allocating memory to the dedicated bucket 160*b*. At 610, the adaptive allocator 180 tracks a first amount of memory used by the dedicated bucket 160*b* during a first tablet cycle, such as during a period when the dedicated bucket 160*b* is disposed within the active tablet 152-1. At 620, the adaptive allocator 180 pre-allocates a second amount of memory for use by the dedicated bucket 160*b* during a next tablet cycle, e.g., when the frozen tablet 152-2 becomes active and the dedicated bucket 160*b* becomes part of the new active tablet. The pre-allocated, second amount of memory is based on the first amount of memory tracked at 610. For example, the pre-allocated, second amount of memory may be the same as the first amount of memory. In this manner, memory pre-allocated to the dedicated bucket 160*b* adapts to changing conditions. It is noted that the volume table 162 and the page table 164 are preferably reset upon each tablet switch 154, such that each tablet cycle begins with empty tables 162 and 164. In some examples, the amounts of memory tracked at 610 and pre-allocated at 620 include not only space for the tables 162 and 164 themselves, but also space for the associated delta records 170 that are pointed to by the tables 162 and 164.

FIG. 7 shows an example method 700 of managing space-accounting updates and provides an overview of certain features described above. At 710, a set of updates is received to space accounting metadata of a specified volume. For example, the active tablet 152-1 receives a metadata change 142*b* for a specified volume, such as volume VI-1. The metadata change 142*b* may include a Diff that provides changes in one or more space-accounting statistics of volume VI-1, such as logical size, physical size, and unique size, for example.

At 720, a lookup is performed for the specified volume in a volume table that maps volumes to respective delta records. The lookup identifies a delta record that stores a set of space-accounting changes for the specified volume. For example, node 120 performs a lookup for volume VI-1 in the volume table 162 and discovers a matching entry (FIG. 3). The matching entry includes a reference that identifies delta record 170-1, which stores space-accounting changes for VI-1.

At 730, the delta record is written to account for the set of updates. For example, existing metadata changes are updated in place, e.g., by applying new changes directly to existing changes such that new values stored in the delta record reflect both the existing changes and the new changes.

In some examples, the method 700 may be embodied as a computer program product including one or more non-transient, computer-readable storage media 750, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

An improved technique has been described of managing updates to space-accounting metadata, such as metadata stored in space-accounting metadata pages 140*b*. The technique includes receiving space-accounting updates 142*b* for a specified volume (VI) and identifying, based on a lookup for the specified volume in a volume table 162, a delta record 170 that stores space-accounting metadata changes for that volume. The technique further includes writing to the delta record 170 to account for the space-accounting updates 142*b*.

Having described certain embodiments, numerous alternative embodiments or variations can be made. For example, although embodiments have been described for managing space-accounting updates for volumes, including their snapshots, a similar approach may be used for other types of data objects, such as file systems, virtual machine disks, or the like.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Further, although the term "user" as used herein may refer to a human being, the term is also intended to cover non-human entities, such as robots, bots, and other computer-implemented programs and technologies. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing space-accounting updates, comprising:

receiving a set of updates to space-accounting metadata of a specified volume;

performing a lookup for the specified volume in a volume table that maps volumes to respective delta records, the lookup identifying a delta record that stores a set of space-accounting changes for the specified volume; and writing to the delta record to account for the set of updates, wherein the method further comprises providing a page table that maps metadata pages to respective delta records, the page table including an entry that maps a first metadata page to the delta record provided for the volume, and arranging the delta record in a delta list, the delta list including multiple delta records for respective volumes having space-accounting metadata stored in the first metadata page.

2. The method of claim 1, wherein modifying the delta record to account for the set of updates includes overwriting one or more of the set of space-accounting changes in place.

3. The method of claim 2, wherein the volume table is a hash map that associates identifiers of volumes with corresponding references to delta records that store space-accounting changes for the respective volumes.

4. The method of claim 2, further comprising:

receiving a second set of updates to space-accounting metadata of a second volume;

in response to determining that the second volume is not listed in the volume table, (i) creating a second delta record for the second volume, (ii) storing the second set of updates in the second delta record, and (iii) creating a new entry in the volume table for the second volume, the new entry associating the second volume with the second delta record.

5. The method of claim 4, wherein a first metadata page stores space-accounting metadata of both the specified volume and the second volume, and wherein the method further comprises arranging the delta record and the second delta record together in a delta list for the first metadata page.

6. The method of claim 2, wherein, prior to receiving the set of updates, the delta record stores multiple metadata elements specifying respective space-accounting changes for the volume, and wherein storing the set of updates in the delta record includes overwriting one or more of the metadata elements in the delta record to reflect the set of updates.

7. The method of claim 6, wherein the metadata elements are respective counts, and wherein storing the set of updates further includes storing relative changes in the respective counts.

8. The method of claim 1, wherein the page table is a hash map that associates identifiers of metadata pages with corresponding references to delta records.

9. The method of claim 1, further comprising:

receiving a third set of updates to space-accounting metadata of a third volume, the space-accounting metadata of the third volume stored in a second metadata page;

in response to the second metadata page not being found in the page table, (i) creating a third delta record for the third volume, (ii) storing the third set of updates in the third delta record, (iii) creating a new volume entry in the volume table for the third volume, the new volume entry associating the third volume with the third delta record, and (iv) creating a new page entry in the page table for the second metadata page, the new page entry associating the second metadata page with the third delta record.

10. The method of claim 1, further comprising storing the volume table and the page table together within a dedicated bucket of an in-memory tablet, the in-memory tablet including multiple buckets that organize metadata changes for respective groups of metadata pages.

11. The method of claim 10, further comprising destaging metadata changes from the in-memory tablet to persistent storage, said destaging including:

reading the first metadata page;

accessing the delta list in which the delta records are arranged for the first metadata page;

modifying the first metadata page account for the metadata changes specified in the delta records of the delta list; and writing the updated first metadata page to persistent storage.

12. The method of claim 10, wherein the in-memory tablet is operated in tablet cycles, and wherein the method further comprises:

determining a first amount of memory used for the dedicated bucket during a first tablet cycle; and pre-allocating a second amount of memory for the dedicated bucket during a second tablet cycle that follows the first tablet cycle, wherein the second amount of memory is based at least in part on the first amount of memory.

13. A computerized apparatus, comprising control circuitry that includes a set of processors coupled to memory, the control circuitry constructed and arranged to:

receive a set of updates to space-accounting metadata of a specified volume;

perform a lookup for the specified volume in a volume table that maps volumes to respective delta records, the lookup identifying a delta record that stores a set of space-accounting changes for the specified volume; and write to the delta record to account for the set of updates, wherein the method further comprises receiving a second set of updates to space-accounting metadata of a second volume, and, in response to determining that the second volume is not listed in the volume table, (i) creating a second delta record for the second volume, (ii) storing the second set of updates in the second delta record, and (iii) creating a new entry in the volume table for the second volume, the new entry associating the second volume with the second delta record.

14. A computer program product including a set of non-transitory, computer-readable media having instructions which, when executed by control circuitry of a computerized apparatus, cause the computerized apparatus to perform a method of managing space-accounting updates, the method comprising:

receiving a set of updates to space-accounting metadata of a specified volume;

performing a lookup for the specified volume in a volume table that maps volumes to respective delta records, the lookup identifying a delta record that stores a set of space-accounting changes for the specified volume; and writing to the delta record to account for the set of updates, wherein modifying the delta record to account for the set of updates includes overwriting one or more of the set of space-accounting changes in place, wherein, prior to receiving the set of updates, the delta record stores multiple metadata elements specifying respective space-accounting changes for the volume, and wherein storing the set of updates in the delta record includes overwriting one or more of the metadata elements in the delta record to reflect the set of updates.

15. The computer program product of claim 14, wherein the method further comprises:

receiving a second set of updates to space-accounting metadata of a second volume;

in response to determining that the second volume is not listed in the volume table, (i) creating a second delta record for the second volume, (ii) storing the second set of updates in the second delta record, and (iii) creating a new entry in the volume table for the second volume, the new entry associating the second volume with the second delta record.

16. The computer program product of claim 14, wherein the method further comprises:

providing a page table that maps metadata pages to respective delta records, the page table including an entry that maps a first metadata page to the delta record provided for the volume; and arranging the delta record in a delta list, the delta list including multiple delta records for respective volumes having space-accounting metadata stored in the first metadata page.

17. The computer program product of claim 16, wherein the method further comprises storing the volume table and the page table together within a dedicated bucket of an in-memory tablet, the in-memory tablet including multiple buckets that organize metadata changes for respective groups of metadata pages.

18. The computer program product of claim 17, wherein the method further comprises destaging metadata changes from the in-memory tablet to persistent storage, said destaging including:

reading the first metadata page;

accessing the delta list in which the delta records are arranged for the first metadata page;

modifying the first metadata page account for the metadata changes specified in the delta records of the delta list; and writing the updated first metadata page to persistent storage.

19. The computer program product of claim 14, wherein the metadata elements are respective counts, and wherein storing the set of updates further includes storing relative changes in the respective counts.

20. The computer program product of claim 16, wherein the page table is a hash map that associates identifiers of metadata pages with corresponding references to delta records.

* * * * *